United States Patent [19]

Conrad

[11] 4,282,319

[45] Aug. 4, 1981

[54] PROCESS FOR THE PREPARATION OF A HYDROLYZED PRODUCT FROM WHOLE GRAIN

[75] Inventor: Ernst Conrad, Lyckeby, Sweden

[73] Assignee: Kockums Construction AB, Hoganas, Sweden

[21] Appl. No.: 951,076

[22] Filed: Oct. 13, 1978

[30] Foreign Application Priority Data

Oct. 18, 1977 [SE] Sweden ............................ 7711742
Nov. 1, 1977 [SE] Sweden ............................ 7712341
Aug. 22, 1978 [SE] Sweden ............................ 7808870

[51] Int. Cl.$^3$ .................... C12P 21/06; A23J 1/12
[52] U.S. Cl. .......................... 435/69; 435/94; 435/96; 435/99; 426/18; 426/28; 426/44
[58] Field of Search ............... 426/18, 44, 31, 28; 195/31 R, 29; 435/68, 99, 94, 96

[56] References Cited

U.S. PATENT DOCUMENTS

| | | | |
|---|---|---|---|
| 2,051,017 | 8/1936 | Schwarz et al. | 426/44 |
| 3,157,513 | 11/1964 | Allen et al. | 426/18 |
| 3,249,512 | 5/1966 | Bode | 426/18 |
| 3,912,590 | 10/1975 | Slott et al. | 195/31 R |
| 3,958,015 | 5/1976 | Gay | 426/44 |

*Primary Examiner*—Lionel M. Shapiro
*Assistant Examiner*—Elizabeth A. Hatcher
*Attorney, Agent, or Firm*—Brumbaugh, Graves, Donohue & Raymond

[57] ABSTRACT

The present invention relates to a process for the preparation of hydrolyzed products from whole grain, and such derived products. The invention solves the problem of obtaining a protein and sugar containing product able to be filtrated whereby this is achieved by treating whole grain, such as wheat, maize, rye, barley, oat, and rice, with a proteolytic enzyme to transform water insoluble proteins into watersoluble products, and further to treat the starch contents with an amylase free from other carbohydrate hydrolyzing enzymes to form water-soluble starch products, as mono and disaccharides, removing the bran fraction and removing water to obtain a dry, semimoist, or liquid but concentrated derived product. The product is to be added as a sweetening agent in food products as bread, drinks, and cereal products, whereby the bran obtained can be used in bread as fiber additive.

13 Claims, No Drawings

PROCESS FOR THE PREPARATION OF A HYDROLYZED PRODUCT FROM WHOLE GRAIN

The present invention relates to a process for the preparation of a product and/or products from whole corn by means of enzymatic hydrolysis and such product and/or products.

It is known to use corn, preferably rice, maize, and wheat, (besides the common use as flour, grain, flakes and the like) for preparation of products from their main components, starch and proteins or to use them as such. Isolated starch is used in preparation of starch syrup or starch sugar by means of hydrolysis in acidic environment and/or by means of enzymatic treatment. Water soluble proteins present were originally used in preparation of glue but have today, due to better refining methods to higher qualities also been used in food industry.

It is thus known from the Swiss Pat. No. 514.674 to produce a product to be used in beer preparation, whereby a starch containing material is mixed with water, pH is djusted in such a way that proteolytic enzymes present in the material is released and peptisation occurs, pH is further adjusted and a heat stable proteolytic enzyme is added to further hydrolyse the material. The material thus obtained is then further treated to give a partial amylolysis and then a complete amylolysis by means of an amylolytic enzyme.

However, a product prepared according to said patent will not contain all the proteins and/or proteolytic products present from the beginning. After filtration, to produce a clear filtrate, it will loose most of its proteins. Such a product in unfiltrated state cannot be used in the preparation of clear products as for example stilldrinks and carbonated soft drinks.

An object of the present invention is to obtain a process for the preparation of product and/or products from whole grain, whereby especially substantially all the essential, nutritionally important proteins of the grain are present in water soluble state substantially as peptides, preferably together with the watersoluble starch hydrolysis products. These water soluble ingredients may in some products also contain all or part of the water insoluble bran parts of the whole grain and starch not converted.

However, another object of the invention is to obtain a clean bran fraction, substantially free from starch.

It is understood that also other substances present in the grain as fats, minerals and vitamins are present in the end product/products.

Grain consists substantially of starch, but also about 10-12 percent of proteins.

Conventional isolation of starch from grain involves great technical problems mainly due to the tendency of proteins, bran, germs and starch granules of gluing together. In order to separate the different parts, manufacturers therefor generally have to use a lot of water. Water which later will carry small parts from the grain and causes increased tendency of growing recipients.

According to the present invention all proteins and starch ingredients are recovered as water soluble hydrolysis products whereby mentioned problems are eliminated. Fats, salts, vitamins and minerals are recovered as well, and as a "byproduct" a fibre rich and almost starch free bran is obtained which is very suitable to stimulate a normal gastro intestinal function.

In order to increase the proteinaceous value of the end product/products, as well as the improved taste derived from hydrolysed lactose another object of the present invention is to use an aqueous medium in the process, which medium consists of whey.

The present invention is based on the fundamental idea that instead of preparing the waterinsoluble protein and starch, these main components are subjected to a process in situ, i.e. when still present in the grain mass. It is understood that the grain has to be crushed in order to make the starch and proteins available to the aqueous solution in which the treatment is to be carried out. As the crushing of the grain is made only to open the grain to make the starch and proteins available the degree of crushing is of minor importance. One can thus crush or grind eg between rollers to coarse flakes and grains down to flour and to make it as wet or dry milling.

All types of grain may be used as heat, rye, barley, oat, maize, rice and the like, whereby however, wheat is preferred.

In dry milling the bran may be sieved off, whereby, however, as will be evident from below it may be preferred to let them be present during processing.

The treatment gives also a possibility of obtaining different end products. Thus one can recover the water solubilized proteins and the water insoluble starch fraction. One may also recover the watersolubilized starch fraction per se and then the bran and waterinsoluble protein fraction per se, which latter fraction then is made water soluble.

The process of the invention thus relates to the preparation of product totally enzymatically hydrolysed from whole grain whereby substantially all of the nutritionally important protein ingredients of the grain are present in water soluble state, and, possibly, substantially all of the starch of the grain is present in water soluble form in the form of degraded products of starch, as well as fats, salts, vitamins and minerals, whereby the invention is characterized in that one crushes the grains and in any order or simultaneously subjects the material thus crushed to (a) on one hand an enzymatic treatment with a proteolytic enzyme for the transformation of water insoluble proteins to water soluble degraded products whereby the enzymatic treatment is carried out using an endopeptidase to give a protein hydrolysate containing 50-60% of peptides having at least 25 amino acid residues, 35-45% of peptides having 5-20 amino acid residues and 4-8% of peptides having up to 4 amino acid residues, the protein fraction being substantially recovered in the filtrate after clear filtration (b) on the other hand an enzymatic treatment using a starch hydrolyzing enzyme for the transformation of water insoluble starch to water soluble degraded products of starch, preferably mono and disaccharides, the enzymatic treatment being carried out using a specific amylase substantially free from other carbohydrate hydrolysing enzymes (c) and further separating off water insoluble bran ingredients and, if present, water insoluble starch components; and (d) further, if desired, completely or partly evaporate the solution of products thus obtaining these in dry, semimoist, or liquid but concentrated form.

A preferred embodiment of the invention is characterized in that process step (a) is carried out prior to or simultaneously with process step (b).

Another preferred embodiment of the invention is characterized in that the process is carried out at a temperature below the gelatinization temperature of the grain used.

A further preferred embodiment of the invention is characterized in that process step (b) is carried out using an α-amylase and then and/or simultaneously using an amyloglucosidase.

Another preferred embodiment of the invention is characterized in that one uses amyloglucosidase at pH 4-4.5 to transformation of starch to glucose.

A further preferred embodiment of the invention is characterized in that one uses amyloglucosidase at pH 6 for the transformation of starch to mainly maltose.

A preferred embodiment of the invention is characterized in that one moreover adds an isomerase for the partial transformation of glucose formed to fructose.

Another preferred embodiment of the invention is characterized in that the water insoluble bran components are isolated in process step (c), which components, if desired, are washed, whereby the components contain at least 60% by weight of fibres, and at most 2% by weight of residual starch. According to another aspect the invention comprises a grain product obtained in accordance with the process, whereby it is characterized in that the proteins are present as a protein hydrolysate enzymatically obtained by an endopeptidase, whereby 50-60% of the peptides present have more than 25 amino acid residues, 35-45% of the peptides have 5-20 amino acid residues and 4-8% of the peptides have up to 4 amino acid residues, which protein hydrolysate is water soluble and capable of being substantially recovered after clear filtration, that the starch is present as enzymatically present starch hydrolysate obtained by a specific amylas substantially free from other carbohydrate hydrolysing enzymes whereby the product is present as powder, syrup or liquid in unconcentrated or concentrated form.

According to another aspect the invention comprises a bran fraction, whereby it is characterized i.e. that it consists of the bran fraction isolated from an enzymatically hydrolyzed grain, which bran fraction contains at least 60% by weight of fibres, and at most 2% by weight of starch residues.

According to a further aspect of the invention the invention comprises food products containing a grain product obtained in accordance with the process and defined in process and product definitions herein.

Process steps (a) and (b) above may be carried out simultaneously, if so desired, but may also be carried out separately, whereby the different fractions are recovered as separate products. The enzymes used are commercially available. The transformation of water insoluble protein to water soluble products is thereby carried out using an endopeptidase and the transformation of starch to water soluble oligosaccharides is carried out using amylases, preferably α-amylas, possibly together with amyloglucosidase, whereby a high content of glucose is obtained. However, as given above, if a certain pH is selected, pH 6, a high content of maltose is obtained which is preferred in certain cases to improve flavour. Isomerase may be used in another preferred embodiment to transform part of the glucose content to fructose, whereby a crystallization of the end product is inhibited. The starch may under certain circumstances be isolated as such.

Suitable enzymes are manufactured industrially and are marketed e.g. by Novo A/S, Copenhagen, and Miles Kalichemi, BRD. Suitable proteolytic enzymes are "Neutrase" (Novo A/S) and "HT Proteolytic" (Miles Kalichemi). α-amylases used are "BANL 120" (Novo A/S) and "Optiamyl-L" (Miles Kalichemi). A suitable β-amylase and maltose forming enzyme, respectively is e.g. "AMG 150" (Novo A/S) and "Optidex-L" (Miles Kalichemi). A useful isomerase is e.g. "Optisweet P" (Miles Kalichemi).

Malted grain may be used to carry out the transformation of a starch to water soluble derivatives. In this case the grains are malted as known per se in beer and liquor production. The malted grain is mixed with water, whereupon a proteolytic enzyme is added. After protein hydrolysis transformation to water soluble starch derivatives is carried out.

According to the invention one may thus obtain a product which, after transformation in situ, contains different nutritionally important components, possibly with or without the bran fraction. According to the invention it is also possible to obtain a product which substantially consists of water soluble proteins products whereby the water insoluble protein fraction is isolated and transformed per se. Thus a bran fraction containing >30% of protein is possible to obtain, as well as protein hydrolysate containing 80-90% of protein.

Such a protein hydrolysate may be mixed with bran and be used in the preparation of soups. Further a pure starch fraction can be obtained, and a pure fraction containing water soluble starch products thereof as glucose and oligosaccharides and a bran fraction, which products mixed or separately isolated are of food industrial interest.

It is evident from above that the main steps of the process are carried out in an aqueous solution or suspension. For economical reasons it is desirable to evaporate the product/products obtained to a suitable water amount for obtaining the product in dry, semimoist, or liquid bust concentrated form. The removal of excess water can be carried out in any suitable manner as e.g. by roller drying, freeze drying, and lyophilisation or the like.

According to the further object of the present invention an economically preferable way for handling whey and its nutritionally valuable content is obtained. The invention thus concerns in a preferred embodiment the use of whey or concentrated whey as aqueous medium in the process of the invention.

In industrial preparation of cheese from milk considerable amounts of whey are obtained as biproduct. The whey is then obtained as a low concentrated solution containing about 6.5% dry matter, (5% of lactose, 1% of proteins, and 0.5% of salts).

Whey has hitherto been used to a very small extent and its main use has been as a feed additive for animal feedstuffs especially for pigs. Depending on the high water content of the whey the kidneys are subject to great strain in connection with the excretion of large water amounts and for this reason whey can only be restrictedly used as feed stuff or feed stuff additive.

It has of course been tried to reduce the water content of whey but as evident the costs are too high to evaporate so large volumes as about 93.5%. One has thus been forced to let the whey being fed to the waste water off-flow. This gives however great environmental problems, and it is, today, no longer possible to let the whey go this way depending on environmental laws and similar directions.

One may either use whey as such or a concentrate thereof, whereby only a minor part of the water of the whey has been evaporated. According to another prepared embodiment of the invention the lactose of the whey is transformed to glucose and galactose, which transformation may take place either separately prior to the addition of the whey to the grain or may be done enzymatically together with process steps (a) and/or (b).

The transformation of lactose to glucose and galactose is preferred as in some areas of the world a great part of the population unable to utilize lactose due to lack of enzyme lactase. This is especially pronounced in many developing countries. Too high amounts of lactose in the food may even create gastro intestinal disturbances in such groups of people which can not utilize lacto.

The transformation of lactose to glucose and galactose is carried out enzymatically using a suitable lactase as e.g. "Novo Lactase" sold by Novo Industry A/S, Copenhagen, Denmark.

In the preferred process using whey products are thus obtained which are still more enriched with regard to saccharides, proteins, and nutritionally important salts.

As mentioned above all the important components of the cereal raw material are recovered in the end product/products. The final syrup, which can be filtrated through a standard filtration procedure can be used either directly as a nutrient or in combination with other nutrients in drinks, breakfast flakes, food for children. A syrup prepared is very suitable for bread baking purposes, as it is similar to flour with regard to its constituents. The baked products obtained are positively affected with regard to colour, taste and freshness.

The syrup can also be used in beer production

The invention will be described in the following examples showing embodiments thereof.

EXAMPLE 1

0.5 g of proteolytic enzyme "Neutrase" (Novo Ind.) were dissolved in 3 liters of water having a temperature of 50° C. 1500 g of coarsely crushed wheat containing 15% of water and 12% of gluten protein (N×6.25) were suspended in the water. After one hour at 50° C. all protein had been transformed into water soluble products thereof, preferably polypeptides, whereby 55% lof the peptides contained more than 25 amino acid residues, 41% of the peptides contained 5-20 amino acid residues, and 4% of the peptides contained 1-4 amino acid residues. Thereupon 0.1 g of α-amylase "BANL 120" were added and the temperature was raised to 75° C. The reaction mixture was kept at 75° C. for 2 hrs, whereupon it was cooled to 60° C. and 0.5 g of maltose forming enzyme "Fungamyl 1600" were added. The suspension was kept at 60° C. for 12 hrs. At this time 60% of maltose had been formed. Depending on the use of the final product the suspension may be sterilized by heating to about 100° C. or further heated. The suspension is then sieved and undissolved husk residues are washed with water. Said water is used in following, new reaction.

The bran components thus washed are dried and the solution is evaporated to the consistency of syrup or is dried alternatively, to a powder. Yield: 85% of syrup dry matter, including dry matter of the wash water; 15% of bran dry matter.

EXAMPLE 2

0.5 g of protease "Neutrase"
0.2 g of -amylase "BANL 120", and
0.2 g of amyloglucosidase "AMG 150"

were added to 3 liters of water of 65° C. The temperature was kept at 65° C. and 1500 g of coarsely crushed wheat were introduced. After 2 hrs all protein and all starch had been transformed to watersoluble form. pH was decreased to 5.0 by the addition of citric acid g.s. and the temperature was kept at 60° C. After 24 hrs 96% of all starch present had been converted to pure glucose. pH of the suspension was increased to 6.0 by adding sodium carbonate. The solid bran fraction was sieved off and washed with water, and dried. The wash water was fed to a new treatment. The solution obtained was used without further treatment in the preparation of still drinks. Yield: 90% sugar/protein dry matter, calculated on the starting material, 15% of bran dry matter.

The bran fraction, which contained about 20% of water, was used without further treatment for mixing with the syrup obtained after evaporation of the solution for baking purposes or form casted with syrup or mixed and dried to a powder. The product thus obtained contained all the valuable nutrients of the wheat grain and the bran fraction. The same product may be obtained by mixing the products obtained from each of the steps (a), (b) and (c).

The bran fraction was analysed and compared with other types of bran preparations.

In the table 1 below product A is a bran fraction according to Example 2 above, product B is a common wheat bran fraction obtained at an ordinary mill, product C is a rye bran fraction, and product D is the official US "AACC Certified Food Grade Wheat Bran RO7-3691". Values given as % of dry substance.

TABLE 1

| Carbohydrate chemical analysis of bran fractions | | | | | |
|---|---|---|---|---|---|
| | | A | B | C | D |
| | Extrationable using 80% ethanol | 7.7 | 15.0 | 13.0 | 14.5 |
| | Ash | 6.1 | — | — | 5.9 |
| | Starch[1] | 1.1 | 21.3 | 37.0 | 20.0 |
| | Cellulose[2] | 13.9 | 14.9 | 13.5 | 10.4 |
| Fibers | Hemicellulose[2] (neutral part) | 37.1 | 28.9 | 23.7 | 23.7 |
| | Hemicellulose[3] (acidic part) + pectin | 2.3 | — | — | 1.5 |
| | Lignin acc. to Klason | 10.2 | 14.4 | 15.0 | 5.2 |
| Fiberanalysis acc. to Van Soest: | | | | | |
| NDF[4] approximative cellulose + hemicellulose + lignin | | 74.2 | — | — | 44.9 |
| ADF[4] approximative cellulose + lignin | | 22.1 | — | — | 12.2 |

[1] Determined enzymatically
[2] Determined by gas liquid chromatography using an ethanol extracted, starch freed sample after total hydrolysis, the glucose value being used approximatively for calculating the values of cellulose and other values of neutral sugars being used for calculating of neutral hemicellulose
[3] Determined by decarboxylation
[4] Not determined freed from ashes.

EXAMPLE 3

The preparation according to Example 2 was repeated with the exception that the transformation using amyloglucosidase was carried out at pH 6 instead of pH 5, whereby the starch was recovered as maltose instead of glucose.

EXAMPLE 4

0.5 g of the proteolytic enzyme "HT Proteolytic" and 0.1 g of the α-amylase "Optiamyl-L" were added to 3 liters of water of 65° C. The suspension was kept at 65° C. and 1.5 kg of maize were added. The maize was coarse crushed. After 3 hours all proteins and all starch has been transformed into soluble form. The temperature was raised to 80° C. and was kept there for 2 hrs. Then the solution was cooled to 60° C. and pH was adjusted to 4.5 by addition of citric acid. 0.2 g of glucose forming amyloglucosidase "Optidex-L" were added. After 24 hrs 97% of the starch present had been transformed into pure glucose. Then pH was adjusted to 6.0 by addition of sodium carbonate and from pH 6.0 to pH 7.0 by addition of magnesium hydroxide. 2 g of fructose forming isomerase enzyme "Optisweet P" were added and the temperature was kept at 60° C. for another 24 hrs while pH was automatically adjusted to pH 7.0 by adding sodium carbonate.

At this moment 40% of the original amount of glucose (97%) had been transformed into fructose. Hereby a crystallisation was inhibited, when the solution after clear filtration was evaporated to a syrup. The bran parts sieved off were washed with water and dried. The wash water was returned. pH of the solution was adjusted to about 6 by adding a small amount of citric acid and was evaporated, as mentioned above, to a syrup. Yield: 90% of a water soluble proteinaceous syrup (dry matter); 15% of bran fraction (dry matter).

EXAMPLE 5

0.2 g of proteolytic enzyme "Neutrase" were added to 3 liters of water of 65° C. To the water a mixture of 0.5 kg of malted and dried wheat and 1 kg of common wheat were added, the malted wheat and the wheat having been crushed together. The mixture of wheat contained 13% of water and 11.5% of protein (N×6.25) of dry substance. After 1 hr at 65° C. the temperature was raised to 80° C. and kept at 80° C. for another hour. Then the solution was cooled at 60° C. and 0.5 g of amyloglucosidase "AMG 150" (Novo A/S) were added. The mixture was kept at 60° C. for another 12 hrs after when the sugar amount had raised to 66 dextrose equivalents. (66 DE). Then the bran fraction was separated off by sieving washed and dried, the wash water being fed in return. The solution was evaporated to a syrup. Yield: 83% proteinacous syrup (calculated on dry matter); 17 bran dry matter.

EXAMPLE 6

0.5 g of proteolytic enzyme "Neutrase" were added to 2.5 liters of water having a temperature of 22° C. 1200 g of malted, crushed barley so called malt having 6% of water and 12% of proteins (N×6.25) therein calculated on dry matter, were added. The mixture was allowed to stand for 12 hrs, after when all proteins had been hydrolysed into water soluble state. The mixture was then added to 0.5 liter of water of 65° C. during 15 minutes and was kept at 65° C. for another 2 hrs whereby 46 dextrose equivalents (46 DE) had been obtained. The bran fraction was sieved off, washed, and dried, the wash water being returned to a new process. The solution obtained was evaporated to a syrup. Yield: 82% proteinacous syrup (dry matter). 18% bran (dry matter).

EXAMPLE 7

0.5 g of proteolytic enzyme "Neutrase" were added to 4 liters of water of 55° C. 1500 g of coarsely crushed wheat were added at 55° C. which temperature was kept for 1 hr at which time all gluten protein had been solubilized. The reaction temperature was raised to 75° C. while adding 0.5 g of α-amylase "BANL 120". The reaction mixture was kept at 75° C. for 6 hrs, whereby all starch had been solubilized (DE-value 38). The suspension was freed from solid components by sieving. The bran fraction was washed with water. The solution obtained was evaporated to dryness (powder). Yield: 82% of protein-sugar (dry matter), 18% of bran (dry matter).

EXAMPLE 8

0.2 g of α-amylase "BANL 120" were added to 4 liters of water of 75° C. Into the solution at 75° C. 1500 g of coarsely crushed wheat were introduced. The temperature was kept at 75° C. for 6 hrs, whereby all starch had been converted into watersoluble products. The temperature was lowered to 55° C. and 1 g of amyloglucosidase and 1.5 g of proteolytic enzyme "Neutrase" were added. After 6 hrs all the proteins had been transformed into watersoluble state and the sugar value had increased to a DE-value of 60. The bran fraction was sieved off and washed with water. Yield: 84% of syrup (dry matter; including wash water dry substance). 18% of bran (dry matter).

EXAMPLE 9

2 kg of crushed wheat (dry matter 87%) were added to 4 liters of water containing 3 g of proteolytic enzyme "Neutrase", and were treated therein for 4 hrs at 50° C. The solubilized phase containing hydrolysed proteins was separated off by centrifuging and was recovered for, if so desired, a combination with pure starch. The solid phase left in the centrifuge together with the bran components was washed with water, about 2 liters, which was recovered for a new process cycle. The solid phase was suspended in 2 liters of water was allowed to pass through a fine meshed vibration sieve. The fine ground wheat starch and the water was allowed to pass, while one bran fraction was vibrated over the sieve and was recovered.

The starch suspension was introduced into a further centrifuge provided with a suitable filtration cloth. The aqueous phase obtained (about 2 liters) was recovered and was used in a new process cycle.

The starch was either recovered as such or hydrolysed to a syrup or sugar as described in the foregoing examples. Yield:

1200 g of starch dry matter (68.5%)
200 g of protein dry matter (11.5%)
300 g of bran dry matter (20.0%)

EXAMPLE 10

4 kg of whey containing 6.5% dry matter were heated to 60° C. and 0.5 g of proteolytic enzyme, "Neutrase" (Novo A/S) were added 1.5 kg of coarsely crushed wheat were introduced. The temperature of the mixture was kept at 60° C. for 1 hr when all water insoluble protein had become water soluble derivatives. Then 0.1 g of α-amylase "BANL 120" (Novo A/S) were added and the reaction temperature was raised to 75° C., which was maintained for 6 hrs, when all starch had been converted into water soluble saccharides, DE-value 38.

The temperature was lowered to 60° C. and 1.0 g of amyloglucosidase "AMG 150" was added. The reaction temperature was kept at 60° C. for another 12 hrs whereby a DE-value of 66 had been obtained.

The reaction mixture was heated to 100° C. for sterilization and inactivation of the enzymes, whereupon the bran fraction was sieved off by centrifuging. The solution was evaporated to a syrup and the bran fraction was dried.

The product obtained had a dry matter content of 1460 g of which 260 g were dry matter derived from whey i.e. 18%.

EXAMPLE 11

4 kg of whey containing 6.5% dry matter were heated to 40° C. 0.4 g of lactase enzyme (Novo A/S) were added and the temperature was kept at 40° C. for 6 hrs. At this time the lactose of the whey had been converted to equal amounts of glucose and galactose.

The temperature was raised to 60° C. and 0.5 g of proteolytic enzyme, "Neutrase" (Novo A/S) were added. 1.5 kg of coarsely crushed wheat were introduced into the reaction mixture and the following treatment was continued in accordance with Example 10 above.

EXAMPLE 12

4 kg of whey, (6.5% dry matter), were heated to 45° C. 0.5 g of lactase, 0.5 g of protease, "Neutrase", 0,1 g of α-amylase, "BANL 120", and 0.5 g of amyloglucosidase "AMG 150" (all from Novo A/S) were introduced therein.

1000 g of coarsely crushed wheat were introduced and the reaction temperature was kept at 45° C. for 5 hrs, when the lactose had been converted to glucose and galactose, and water insoluble proteins of the wheat had been converted into water soluble products.

The temperature was raised to 70° C. and kept there for another 5 hrs, when all water insoluble starch had been converted into water soluble saccharides having a DE-value of 50.

The bran fraction was separated off by centrifuging, and the solution was evaporated to a syrup. The end product contained 25% of dry matter derived from whey.

EXAMPLE 13

4 kg of concentrated whey (13% dry matter) were heated to 65° C. 0.5 g of proteolytic enzyme, "Neutrase" 0.1 g of -amylase "BANL 120" and 0.5 g of amyloglucosidase "AMG 150" (all from Novo A/S) were added.

The temperature was kept at 65° C. for 12 hrs, when water insoluble protein and starch had been converted into water soluble products. The solution had a DE-value of 6.5. The bran fraction was separated off, and the solution was concentrated to a syrup, 30% of the dry matter of the syrup derived from whey.

EXAMPLE 14

4 liters of concentrated whey (20% dry matter) were kept at ambient temperature (20° C.). 1 g of proteolytic enzyme "Neutrase" (Novo A/S) and 1.1 kg of crushed barley were added.

The mixture was stirred for 4 hrs when all protein had been dissolved.

Then 0.2 g of α-amylase "BANL 120" (Novo A/S) were added, and the temperature was raised to 75° C. and kept at 75° C. for another 4 hrs. After said 4 hrs all starch had been converted to water soluble sugar derivatives, and a DE-value of 40 was determined. The reaction mixture was sterilized at 100° C. and the bran fraction was separated off.

The solution was dried to a powder. 50% of the dry matter obtained derived from whey.

EXAMPLE 15

Wheat bread having separate bran.
A wheat bread was prepared from
1000 g of water
25 g of salt
300 g of wheat syrup (DE value 65, 80% dry substance, pH 6.2) prepared acc. to Example 2.
50 g of yeast
200 g of bran obtained acc. to Example 2
1000 g of wheat flour.

The ingredients are mixed together, fermented, and baked in owen in conventional way.

The bread obtained contains 124 g of protein, whereby 100 g derives from the wheat flour. Increase about 25%.

If the wheat flour in a normal bread is replaced by whole wheat flour such a bread will contain 150 g of bran, compared with a bread above which contains 200 g of bran. A normal bread will thereby become more "heavy" and not so porous as a bread above.

EXAMPLE 16

A milkshake was prepared from
1200 g of wheat syrup (DE-value 70, 20% dry substance, protein 11%) acc. to Example 2.
400 g milk from whole milk powder 20% dry substance.
0.1 ml of vanilla essence
The components are mixed and pH is adjusted to 6.2 using sodium bicarbonate and sterilized. The end product may be diluted with equal part of water prior to use.

EXAMPLE 17

A milkshake with cocoa flavor was prepared: 1200 g of wheat syrup acc. to Example 2 (17% dry substance) were boiled together with 15 g of cocoa powder and is then adjusted to 17% dry substance by adding water. 400 g of milk having 17% dry substance from whole milk powder are added. pH is adjusted to 6.8 using sodium bicarbonate and is sterilized. The final product is consumed in the end form.

EXAMPLE 18

A milkshake with coffee flavour was prepared:
In 1200 g of wheat syrup acc. to example 2 (13% dry substance) 7.5 g of freeze dried coffee (Nescafe, Nestle) are dissolved. Then 400 g of whole milk (13% dry substance) are added and pH is adjusted to 6.8 using sodium bicarbonate. The solution is sterilized and consumed as such.

EXAMPLE 19

A drink with taste of beer is prepared from:
750 ml of wheat syrup (DE-value 67, 36% dry substance) acc. to example 3.
8.5 ml of hopextract (Flavoring 010977)
5.5 g of citric acid
3 g of sodium bicarbonate.

The ingredients are mixed. 70 ml thereof are diluted to 330 ml using water. Dry substance 7.5%. pH 4.1. This drink can, if desired, be brewed in a conventional way by adding common yeastculture.

EXAMPLE 20

A soft drink was prepared from:
1750 ml of wheat syrup acc. to example 2 (DE-value 67, 52% dry substance)
0.5 ml of lemon flavour (Flavoring 061271)
10 ml of grape extract (Flavoring 140278)
7 ml of mango essence
20 g of citric acid
15 g of Na-benzoate.

The ingredients are mixed and diluted to 2.500 ml using water, which gives a dry matter content of 35%, pH 4,4. The solution is filtered to clearness. 80 ml of the solution are diluted to 330 ml using carbonated water or ordinary water. It should be understood that any other flavour than in this example as cola, coffee, pear, banana etc. may be used.

EXAMPLE 21

"Fruit juice" containing protein, maltose and dextrose was prepared from:

| | |
|---|---|
| 100 g of wheat syrup (DE 70, 42% dry substance) acc. to Ex. 2. | |
| 90 g of conc apple juice. (47% dry substance). | |
| 190 g juice (44% dry substance). | |

1.5 g of citric acid and 1 g of Na-benzoate are added. 95 g of the solution are diluted to 320 ml using water. Dry substance 13%.

In Example 21 above apple juice has been used. It should be understood that any other juice as orange, grapefruit, lemon, lime and the like juices may be used.

EXAMPLE 22

Breakfast Cereal product containing wheat syrup and bran prepared from
1000 g wheat bran made acc. to Ex. 2
250 g wheat syrup acc. to Ex. 2
10 g salt The ingredients are mixed and the mix is dried and eventually roasted.

In the examples above, especially examples 15–18 it is evident that a syrup according to any of examples 10–14 prepared one way or the other can be used for preparation of the products.

I claim:

1. A process for preparing in situ, enzymatically hydrolyzed protein and starch products from whole grain, comprising crushing said grain and thereafter subjecting the crushed grain to a treatment which consists essentially of both the following steps:
   (a) subjecting said grain to an enzymatic treatment in an aqueous medium with an endopeptidase so as to transform substantially all water-insoluble proteins present in the grain to water-soluble protein products, which thereafter are filtered and recovered from the crushed grain as a clear filtrate containing protein products containing about 50 to 60% peptides having at least 25 amino acid residues, 35 to 45% peptides having between about 5 to 20 amino acid residues and 4–8% peptides having up to 4 amino acid residues and subjecting the remaining crushed grain to
   (b) an enzymatic treatment in an aqueous medium with at least one starch hydrolyzing enzyme so as to transform substantially all of the water-insoluble starch fraction in the grain to water-soluble, degraded products of starch, and wherein the starch hydrolyzing enzyme is amylase substantially free from other carbohydrate hydrolyzing enzymes.

2. A process according to claim 1 wherein upon completion of process steps (a) and (b) any remaining water-insoluble husk components of said grain such as bran and water-insoluble starch components are separated.

3. A process according to claim 1, wherein the water-soluble protein products and water-soluble degraded products of starch are obtained in a dry, semimoist or liquid concentrated form by completely or partly removing any water associated with said products.

4. A process according to claim 1, wherein the water-soluble degraded products of starch obtained in step (b) are mono and disaccharides.

5. A process for preparing in situ enzymatically hydrolyzed protein and starch products from whole grain, comprising crushing said grain and thereafter subjecting the crushed grain to a treatment which consists essentially of both the following steps:
   (a) subjecting said grain to an enzymatic treatment in an aqueous medium with an endopeptidase so as to transform substantially all water-insoluble proteins present in the grain to water-soluble protein products, which thereafter are filtered and recovered from the crushed grain as a clear filtrate containing protein products containing about 50 to 60% peptides having at least 25 amino acid residues, 35 to 45% peptides having between about 5 to 20 amino acid residues and 4–8% peptides having up to 4 amino acid residues and subjecting the remaining crushed grain to
   (b) an enzymatic treatment in an aqueous medium with α-amylase followed sequentially by an amyloglucosidase both enzymes substantially free from other carbohydrate hydrolyzing enzymes so as to transform substantially all the water-insoluble starch fraction in the grain to water-soluble, degraded products of starch.

6. A process according to claim 5, wherein the enzymatic treatment in step (b) is carried out in an aqueous medium with α-amylase followed simultaneously by an amyloglucosidase, both enzymes substantially free from other carbohydrate hydrolyzing enzymes so as to transform substantially all of the water-insoluble starch fractions in the grain to water-soluble, degraded products of starch.

7. A process according to claim 5, wherein the amyloglucosidase is at a pH of between 4 to 4.5, so as to transform substantially all the water-insoluble starch fractions in the grain to glucose.

8. A process according to claim 7, wherein the glucose is treated with isomerase to transform the glucose to fructose.

9. A process for preparing in situ, enzymatically hydrolyzed protein and starch products from whole grain, comprising crushing said grain and thereafter subjecting the crushed grain to a treatment which consists essentially of both the following steps:

(a) subjecting said grain to an enzymatic treatment in an aqueous medium containing whey with an endopeptidase so as to transform substantially all water-insoluble proteins present in the grain to water-soluble protein products, which thereafter are filtered and recovered from the crushed grain as a clear filtrate containing protein products containing about 50 to 60% peptides having at least 25 amino acid residues, 35 to 45% peptides having between about 5 to 20 amino acid residues and 4–8% peptides having up to 4 amino acid residues and subjecting the remaining crushed grain to (b) an enzymatic treatment in an aqueous medium containing whey with at least one starch hydrolyzing enzyme so as to transform substantially all of the water-insoluble starch fraction in the grain to water-soluble, degraded products of starch, and wherein the starch hydrolyzing enzyme is amylase substantially free from other carbohydrate hydrolyzing enzymes.

10. A process according to claim 9, wherein the grain is subjected in step (a) to an enzymatic treatment in an aqueous medium containing whey with an endopeptidase and a suitable lactase so as to simultaneously transform the whey's lactose to gluclose and galactose and to transform substantially all water-insoluble proteins present in the grain to water-soluble protein products.

11. A process according to claim 2 wherein said husk component, after washing, contain at least about 60% by weight of fibers and no more than about 2% by weight of residual starch.

12. A process according to claim 5, wherein the amyloglucosidase is at a pH of 6, so as to transform substantially all the water-insoluble starch fractions in the grain to maltose.

13. A process for preparing in situ, an enzymatically hydrolyzed protein and starch product from whole grain, which thereafter may be recovered as a clear liquid, consisting essentially of crushing the grain and thereafter subjecting the crushed grain to simultaneous enzymatic treatment in an aqueous medium with an endopeptidase and at least one starch hydrolyzing enzyme which is amylase, substantially free from other carbohydrate hyrolyzed enzymes, so as to transform substantially all of the water-insoluble proteins and starch present in the grain to a water-soluble protein and degraded starch product, said water-soluble protein and degraded starch product containing about 50–60% peptides having at least 25 amino acid residues, 35–45% peptides having between 5–20 amino acid residues and 4 to 8% peptides having up to 4 amino acid residues.

* * * * *

UNITED STATES PATENT AND TRADEMARK OFFICE
CERTIFICATE OF CORRECTION

PATENT NO. : 4,282,319
DATED : August 4, 1981
INVENTOR(S) : Ernst Conrad

It is certified that error appears in the above—identified patent and that said Letters Patent is hereby corrected as shown below:

Column 1, line 7, "corn" should read -- grain --.
Column 1, line 9, "corn" should read -- grain --.
Column 1, line 23, "djusted" should read -- adjusted --.
Column 1, line 34, "loose" should read -- lose --.
Column 2, line 18, "heat" should read -- wheat --.
Column 4, line 6, after "e.g." insert -- "Fungamyl 1600" (Nove A/S) and suitable amyloglucosidases are e.g. --.
Column 4, line 21, "proteins products" should read -- protein products --.
Column 5, lines 3 and 4, "prepared" should read -- preferred --.
Column 5, line 12, after "population" insert -- is --.
Column 5, line 17, "lacto" should read -- lactose --.
Column 5, line 48, "lof" should read -- of --.
Column 7, line 56, "17" should read -- 17% --.
Column 9, line 60, "-amylase" should read -- α-amylase --.
Column 10, line 30, "owen" should read -- oven --.
Column 10, line 45, after "400 g" insert -- of --.
Column 14, line 4, "component" should read -- components --.
Column 14, line 20, "hyrolyzed" should read -- hydrolyzed --.

Signed and Sealed this

Thirtieth Day of March 1982

[SEAL]

Attest:

GERALD J. MOSSINGHOFF

Attesting Officer    Commissioner of Patents and Trademarks